(12) United States Patent
Kasuga et al.

(10) Patent No.: US 8,757,636 B2
(45) Date of Patent: Jun. 24, 2014

(54) VEHICLE HEIGHT ADJUSTING DEVICE

(71) Applicant: Showa Corporation, Gyoda (JP)

(72) Inventors: Takahiro Kasuga, Haga-gun (JP);
Fumiaki Ishikawa, Haga-gun (JP);
Shunya Senda, Haga-gun (JP)

(73) Assignee: Showa Corporation, Gyoda, Saitama (JP)

( * ) Notice: Subject to any disclaimer, the term of this patent is extended or adjusted under 35 U.S.C. 154(b) by 0 days.

(21) Appl. No.: 13/801,222

(22) Filed: Mar. 13, 2013

(65) Prior Publication Data

US 2014/0084556 A1    Mar. 27, 2014

(30) Foreign Application Priority Data

Sep. 24, 2012 (JP) ................................. 2012-209768

(51) Int. Cl.
*B60G 17/016* (2006.01)
*B60G 17/017* (2006.01)

(52) U.S. Cl.
USPC ................... 280/6.152; 280/6.157; 280/5.514

(58) Field of Classification Search
USPC ............ 280/6.157, 5.514, 6.15, 6.159, 6.154,
280/6.155, 6.151, 6.152
See application file for complete search history.

(56) References Cited

U.S. PATENT DOCUMENTS

| 2,956,443 | A | * | 10/1960 | Nelson | 74/336.5 |
| 4,568,101 | A | * | 2/1986 | Bleustein et al. | 180/227 |
| 4,775,025 | A | * | 10/1988 | Parker et al. | 180/219 |
| 5,211,420 | A | * | 5/1993 | Iwashita | 280/5.503 |
| 5,348,112 | A | * | 9/1994 | Vaillancourt | 180/227 |
| 5,711,390 | A | * | 1/1998 | Hikichi et al. | 180/219 |
| 7,270,211 | B1 | * | 9/2007 | Jones | 180/219 |
| 7,287,761 | B2 | * | 10/2007 | Montgomery | 280/5.514 |
| 7,470,213 | B2 | * | 12/2008 | Matsudaira et al. | 477/120 |
| 8,046,141 | B2 | * | 10/2011 | Nedachi et al. | 701/51 |
| 8,262,100 | B2 | * | 9/2012 | Thomas | 280/5.514 |
| 2012/0095667 | A1 | * | 4/2012 | Hase | 701/103 |

FOREIGN PATENT DOCUMENTS

JP    2008-022680 B    3/1996

* cited by examiner

*Primary Examiner* — Drew Brown
(74) *Attorney, Agent, or Firm* — Leason Ellis LLP

(57) ABSTRACT

Provided is technology of raising or lowering vehicle height even if the grasp of vehicle speed is disabled. A vehicle height adjusting device includes a rear suspension capable of changing relative positions of a vehicle body frame and a wheel of a motorcycle including a transmission configured by a plurality of gears and a control device configured to control the rear suspension and change the relative positions of the rear wheel and the vehicle body frame to adjust vehicle height, which is the height of the vehicle body frame. The control device controls the rear suspension to increase the vehicle height when a gear position of the transmission is equal to or higher than a predetermined gear position set in advance and reduce the vehicle height when the gear position is lower than the predetermined gear position.

4 Claims, 7 Drawing Sheets

Compression process

Extension process

VEHICLE HEIGHT ADJUSTING DEVICE

CROSS REFERENCE TO RELATED APPLICATIONS

This application is based on and claims priority under 35 USC §119 from Japanese Patent Application No. 2012-209768 filed Sep. 24, 2012.

BACKGROUND OF THE INVENTION

1. Field of the Invention

The present invention relates to a vehicle height adjusting device.

2. Description of the Related Art

In recent years, there has been proposed a device for increasing vehicle height during traveling of a motorcycle and reducing the vehicle height during a stop to make it easy to get on and off the motorcycle.

For example, a vehicle height adjusting device described in Japanese Examined Patent Publication No. H8-22680 automatically changes vehicle height in response to the vehicle speed of a motorcycle, automatically increases the vehicle height when the vehicle speed reaches set speed, and automatically reduces the vehicle height when the vehicle speed falls to speed equal to or lower than the set speed.

[Patent Literature 1] Japanese Examined Patent Publication No. H8-22680

SUMMARY OF THE INVENTION

In a configuration for automatically changing vehicle height in response to the vehicle speed of a motorcycle, it is likely that the level of the vehicle height cannot be changed if the vehicle speed cannot be grasped. In general, to grasp the vehicle speed, a sensor for detecting a rotating angle of a front wheel, a rear wheel, or a gear of a transmission is provided and the vehicle speed is calculated on the basis of a pulse signal, which is an output signal from the sensor. Therefore, compared with a case in which the vehicle speed is grasped on the basis of a signal, which is not a pulse signal, a circuit and processing for grasping the vehicle speed are complicated. Therefore, it is highly probable that a deficiency occurs in the circuit and the processing and the vehicle speed cannot be grasped.

An object of the present invention is to provide a vehicle speed adjusting device that can change the level of vehicle height even if vehicle speed cannot be grasped.

To attain the object, the present invention provides a vehicle height adjusting device including: a changing unit capable of changing relative positions of a vehicle main body and a wheel of a vehicle including a transmission configured by a plurality of gears; and a control unit for controlling the changing unit and changing the relative positions of the wheel and the vehicle main body to adjust vehicle height, which is the height of the vehicle main body. The control unit controls the changing unit to increase the vehicle height when a gear position of the transmission is equal to or higher than a predetermined gear position set in advance and reduce the vehicle height when the gear position is lower than the predetermined gear position.

It is preferable that the control unit controls the changing unit to increase the vehicle height when the gear position of the transmission including gears for two or more gear positions is second or higher gear position and reduce the vehicle height when the gear position is first gear position.

From another viewpoint, the present invention provides a vehicle height adjusting device including: a changing unit capable of changing relative positions of a vehicle main body and a wheel of a vehicle including a transmission configured by a plurality of gears; and a control unit for controlling the changing unit and changing the relative positions of the wheel and the vehicle main body to adjust vehicle height, which is the height of the vehicle main body. The control unit stores, for each of gear positions of the transmission, vehicle speed defined in advance according to the gear position and controls the changing unit to increase the vehicle height when a gear position of the transmission is a gear position where the defined vehicle speed is equal to or higher than first vehicle speed set in advance and reduce the vehicle height when the gear position is a gear position where the defined vehicle speed is lower than second vehicle speed set in advance.

It is preferable that, if vehicle speed defined in advance according to one gear position among a plurality of gear positions of the transmission is lower than the first vehicle speed and the second vehicle speed and vehicle speed defined in advance according to another gear position, which is higher by one than the one gear position, is equal to or higher than the first vehicle speed and the second vehicle speed, the control unit controls the changing unit to increase the vehicle height when the gear position of the transmission is equal to or higher than the other gear position and reduce the vehicle height when the gear position is equal to or lower than the one gear position.

According to the present invention, it is possible to change the level of vehicle height even if vehicle speed cannot be grasped.

DESCRIPTION OF THE PREFERRED EMBODIMENT

An embodiment of the present invention is explained in detail with reference to the accompanying drawings.

Figure 1:
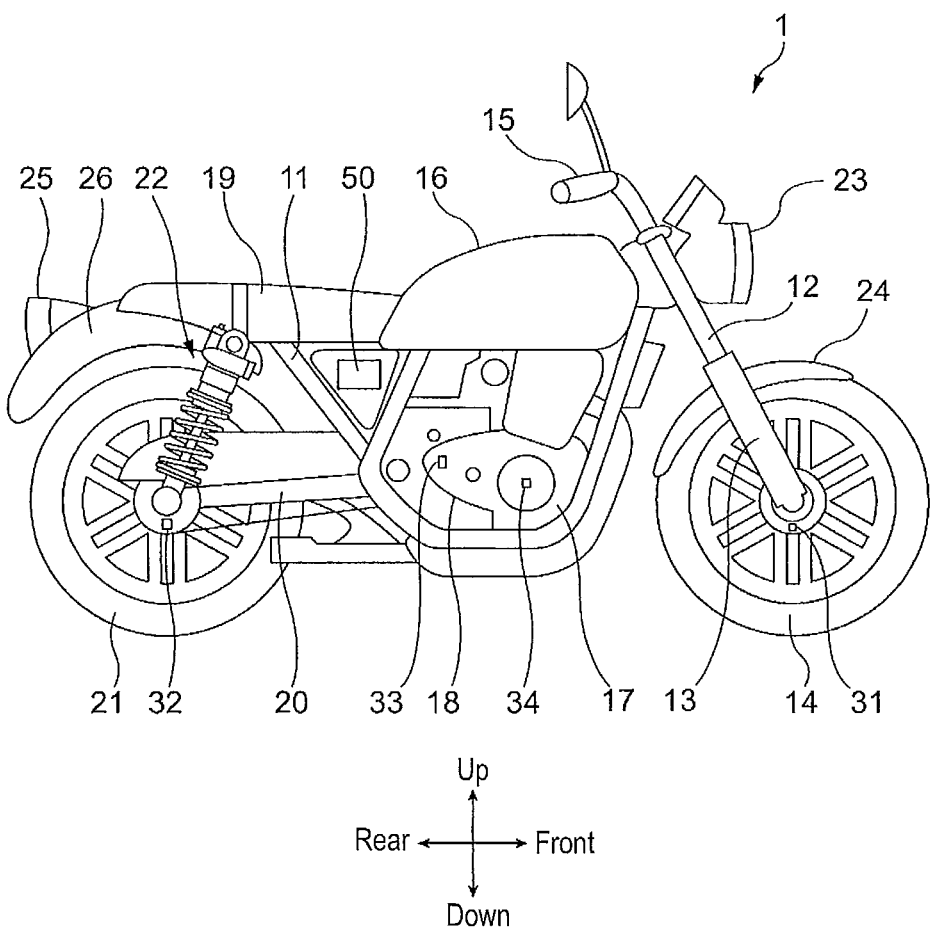
FIG. 1 is a diagram showing a schematic configuration of a motorcycle according to an embodiment.

FIG. 1 is a diagram showing a schematic configuration of a motorcycle 1 according to the embodiment.

The motorcycle 1 includes, as shown in FIG. 1, a vehicle body frame 11, a head pipe 12 attached to the front end of the vehicle body frame 11, a front fork 13 provided in the head pipe 12, and a front wheel 14 attached to the lower end of the front fork 13.

The motorcycle 1 includes a handlebar 15 attached to an upper part of the front fork 13, a fuel tank 16 attached to a front upper part of the vehicle body frame 11, and an engine 17 and a transmission 18 arranged below the fuel tank 16. The transmission 18 is a transmission capable of selecting a reduction gear ratio (a gear) according to operation by a driver. In this embodiment, the transmission 18 includes gears for first gear to fifth gear.

The motorcycle 1 includes a seat 19 attached to a rear upper part of the vehicle body frame 11, a swing arm 20 swingably attached to a lower part of the vehicle body frame 11, a rear wheel 21 attached to the rear end of the swing arm 20, and a rear suspension 22 attached between a rear part of the wing arm 20 (the rear wheel 21) and a rear part of the vehicle body frame 11. The rear suspension 22 is explained in detail below.

The motorcycle 1 includes a headlamp 23 arranged in front of the head pipe 12, a front fender 24 attached to the front fork 13 to cover an upper part of the front wheel 14, a tail lamp 25 arranged behind the seat 19, and a rear fender 26 attached under the tail lamp 25 to cover an upper part of the rear wheel 21.

The motorcycle 1 includes a front wheel rotation detection sensor 31 configured to detect a rotating angle of the front wheel 14, a rear wheel rotation detection sensor 32 configured to detect a rotating angle of the rear wheel 21, a gear position detection sensor 33 configured to detect the position of a gear of the transmission 18, and an engine rotation detection sensor 34 configured to detect a rotating angle of the engine 17.

Further, the motorcycle 1 includes a control device 50 configured to control opening and closing of a below-mentioned change-over valve 170 of the rear suspension 22 to control the vehicle height of the motorcycle 1. Output signals from the front wheel rotation detection sensor 31, the rear wheel rotation detection sensor 32, the gear position detection sensor 33, the engine rotation detection sensor 34, and the like are input to the control device 50.

The rear suspension 22 is explained in detail.

Figure 2:
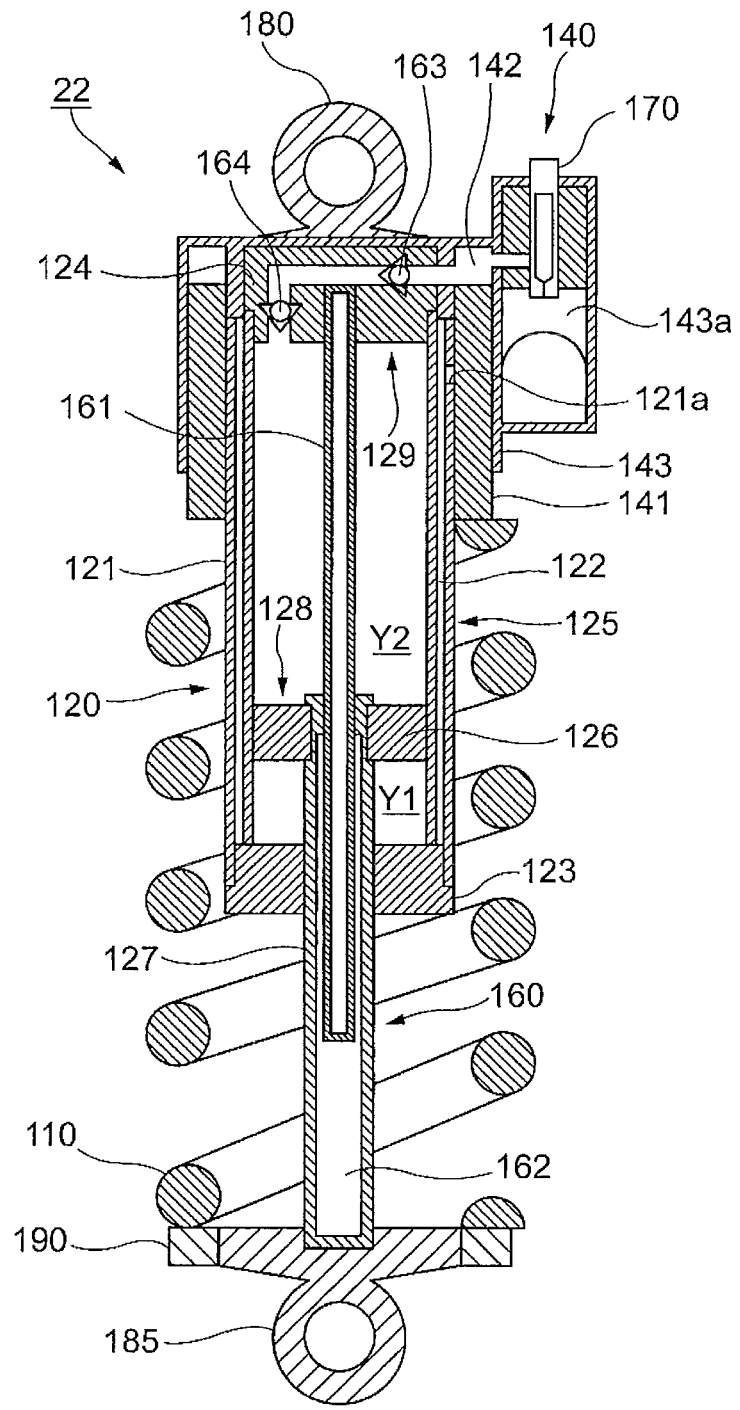
FIG. 2 is a sectional view of a rear suspension.

FIG. 2 is a sectional view of the rear suspension 22.

The rear suspension 22 is attached between the vehicle body frame 11, which is an example of a vehicle main body, of the motor cycle 1 and the rear wheel 21, which is an example of a wheel. The rear suspension 22 includes a suspension spring 110 configured to support the vehicle weight of the motorcycle 1 and absorb a shock and a shock absorber (a damper) 120 configured to attenuate the vibration of the suspension spring 110. The rear suspension 22 includes a relative position changing device 140 capable of changing relative positions of the vehicle body frame 11 and the rear wheel 21 by adjusting a spring force of the suspension spring 110 and a liquid supply device 160 configured to supply liquid to the relative position changing device 140. Further, the rear suspension 22 includes a vehicle body side attachment member 180 for attaching the rear suspension 22 to the vehicle body frame 11, an axle side attachment member 185 for attaching the rear suspension 22 to the rear wheel 21, and a spring bearing 190 attached to the axle side attachment member 185 and configured to support one end (in FIG. 2, a lower part) in a center line direction in the suspension spring 110.

The shock absorber 120 includes, as shown in FIG. 2, a cylinder 125 including an outer cylinder 121 having a thin cylindrical shape, an inner cylinder 122 having a thin cylindrical shape housed in the outer cylinder 121, a bottom lid 123 configured to close one end (in FIG. 2, a lower part) in the center line direction (in FIG. 2, the up down direction) of a cylinder of the cylindrical outer cylinder 121, and an upper lid 124 configured to close the other end (in FIG. 2, an upper part) in the center line direction of the inner cylinder 122. In the following explanation, the center line direction of the cylinder of the outer cylinder 121 is simply referred to as "center line direction".

The shock absorber 120 includes a piston 126 inserted into the inner cylinder 122 to be capable of moving in the center line direction and a piston rod 127 configured to extend in the center line direction and support the piston 126 at the other end (in FIG. 2, the upper end) in the center line direction. The piston 126 is in contact with the inner circumferential surface of the inner cylinder 122 and partitions a space in which liquid (in this embodiment, oil) is encapsulated in the cylinder 125 into a first oil chamber Y1 further on one end side in the center line direction than the piston 126 and a second oil chamber Y2 further on the other end side in the center line direction than the piston 126. The piston rod 127 is a cylindrical member. A below-mentioned pipe 161 is inserted into the inside of the piston rod 127.

The shock absorber 120 includes a first damping force generating device 128 arranged on the other end side in the center line direction in the piston rod 127 and a second damping force generating device 129 arranged on one end side in the center line direction in the inner cylinder 122. The first damping force generating device 128 and the second damping force generating device 129 attenuate stretching vibration of the cylinder 125 and the piston rod 127 involved in absorption of an impact force from the road surface by the suspension spring 110. The first damping force generating device 128 is arranged to function as a communication path between the first oil chamber Y1 and the second oil chamber Y2. The second damping force generating device 129 is arranged to function as a communication path between the second oil chamber Y2 and a below-mentioned jack chamber 142 of the relative position changing device 140.

The liquid supply device 160 is a device configured to perform a pumping action according to telescopic motion of the piston rod 127 with respect to the cylinder 125 and supply the liquid into the jack chamber 142 of the relative position changing device 140.

The liquid supply device 160 includes a cylindrical pipe 161 fixed to the upper lid 124 of the shock absorber 120 to extend in the center line direction. The pipe 161 is coaxially inserted in a pump chamber 162, which is the inside of the cylindrical piston rod 127.

The liquid supply device 160 includes a check valve for ejection 163 configured to eject the liquid in the pump chamber 162, which is pressurized by the movement of the piston rod 127 in a direction for entering the cylinder 125 and the pipe 161, to the jack chamber 142 side and a check valve for suction 164 configured to suck the liquid in the cylinder 125 into the pump chamber 162 in which negative pressure is generated by the movement of the piston rod 127 in a direction for exiting the cylinder 125 and the pipe 161.

Figure 3A:
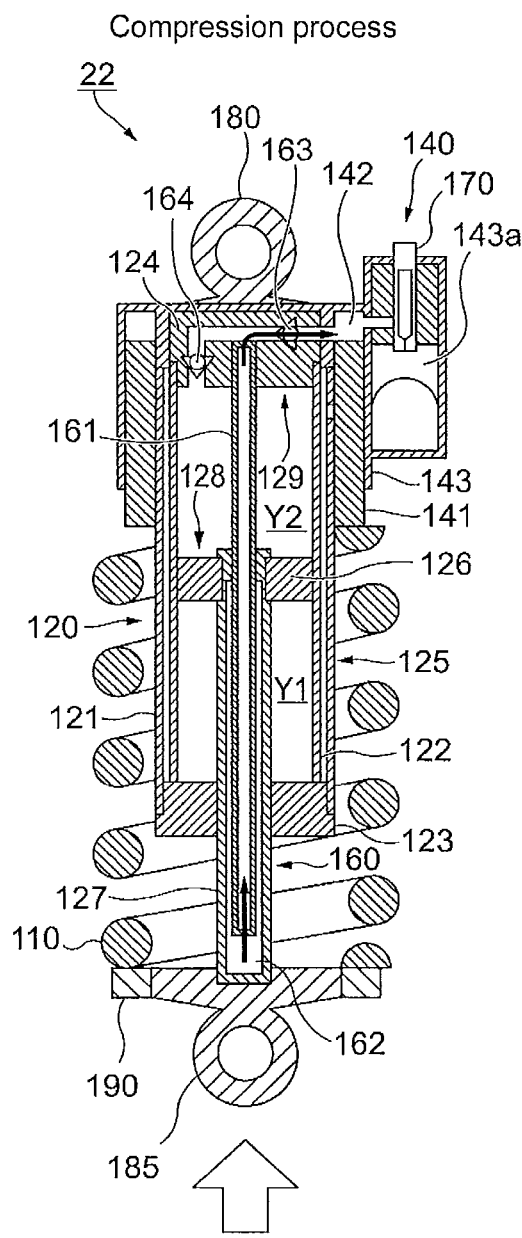
FIGS. 3A and 3B are diagrams for explaining the action of a liquid supply device.
Figure 3B:
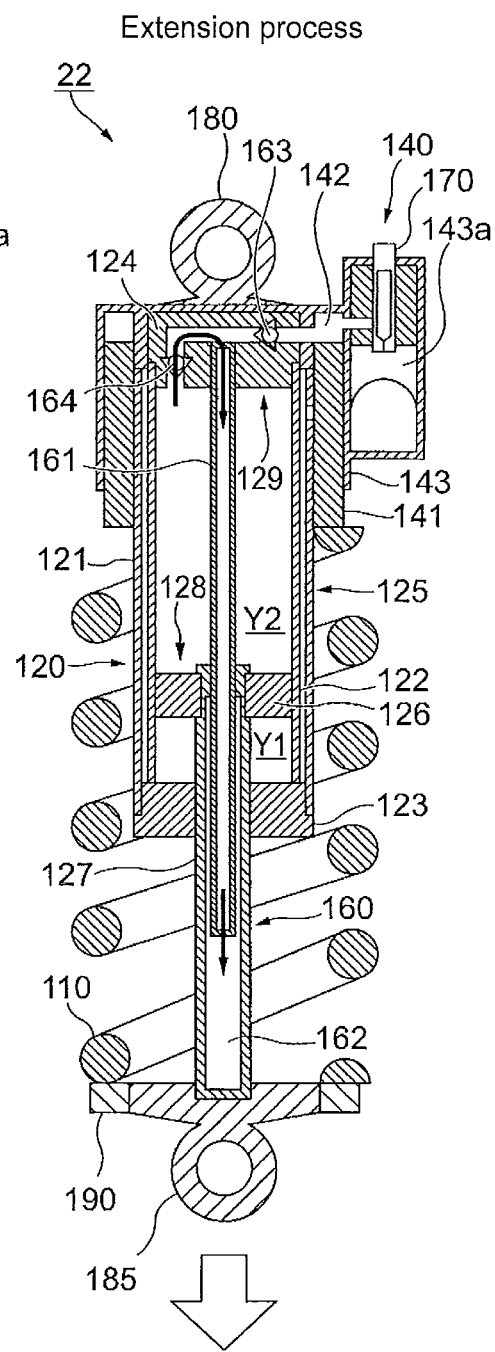

FIGS. 3A and 3B are diagrams for explaining the action of the liquid supply device 160.

In the liquid supply device 160 configured as explained above, when the motorcycle 1 travels and the rear suspension 22 receives a force because of unevenness of the road surface, the piston rod 127 performs a pumping action according to telescopic motion of the piston rod 127 entering and exiting the cylinder 125 and the pipe 161. When the pump chamber 162 is pressurized by the pumping action, the liquid in the pump chamber 162 opens the check valve for ejection 163 and is ejected to the jack chamber 142 side of the relative position changing device 140 (see FIG. 3A). When negative pressure is generated in the pump chamber 162, the liquid in the second oil chamber Y2 of the cylinder 125 opens the check valve for suction 164 and is sucked into the pump chamber 162 (see FIG. 3B).

The relative position changing device 140 includes a supporting member 141 arranged to cover the outer circumference of the cylinder 125 of the shock absorber 120 and configured to support the other end (in FIG. 2, an upper part) in the center line direction in the suspension spring 110 and a hydraulic jack 143 arranged to cover the outer circumference of the other end side (in FIG. 2, the upper side) in the center line direction in the cylinder 125 and configured to form the jack chamber 142 in conjunction with the supporting member 141. The liquid in the cylinder 125 is filled in the jack chamber 142 or the liquid is discharged from the inside of the jack chamber 142, whereby the supporting member 141 moves in the center line direction with respect to the hydraulic jack 143. The vehicle body side attachment member 180 is attached to an upper part of the hydraulic jack 143. The supporting member 141 moves in the center line direction with respect to the hydraulic jack 143, whereby a spring force of the suspension spring 110 changes and a relative position of the seat 19 with respect to the rear wheel 21 changes.

The relative position changing device 140 includes a change-over valve 170 closed to store the liquid supplied to the jack chamber 142 in the jack chamber 142 and opened to discharge the liquid supplied to the jack chamber 142 to a liquid reservoir chamber 143a formed in the hydraulic jack 143. The change-over valve 170 can be illustrated as a well-known solenoid actuator.

Figure 4A:
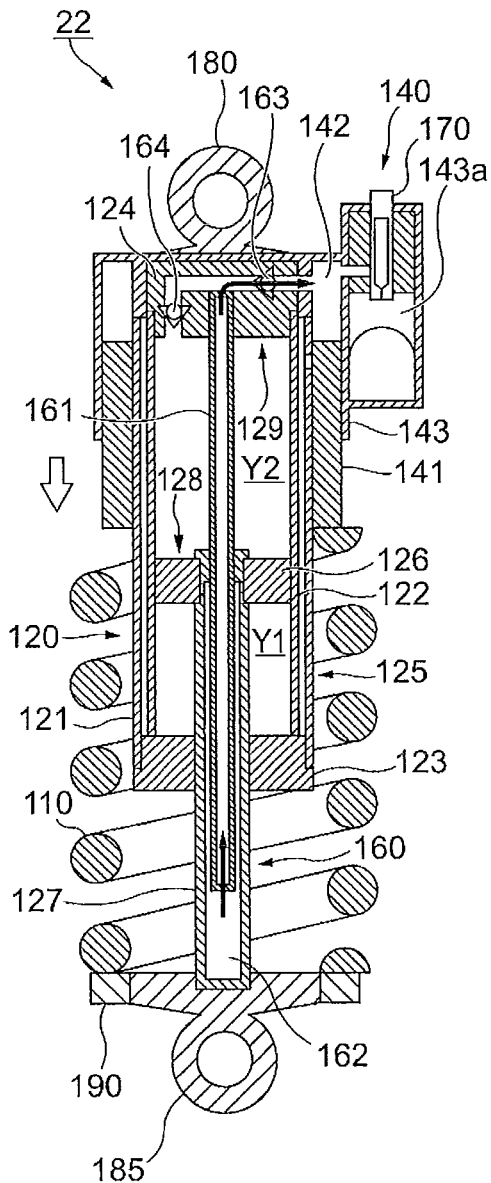
FIGS. 4A and 4B are diagrams for explaining vehicle height adjustment by a relative position changing device.
Figure 4B:
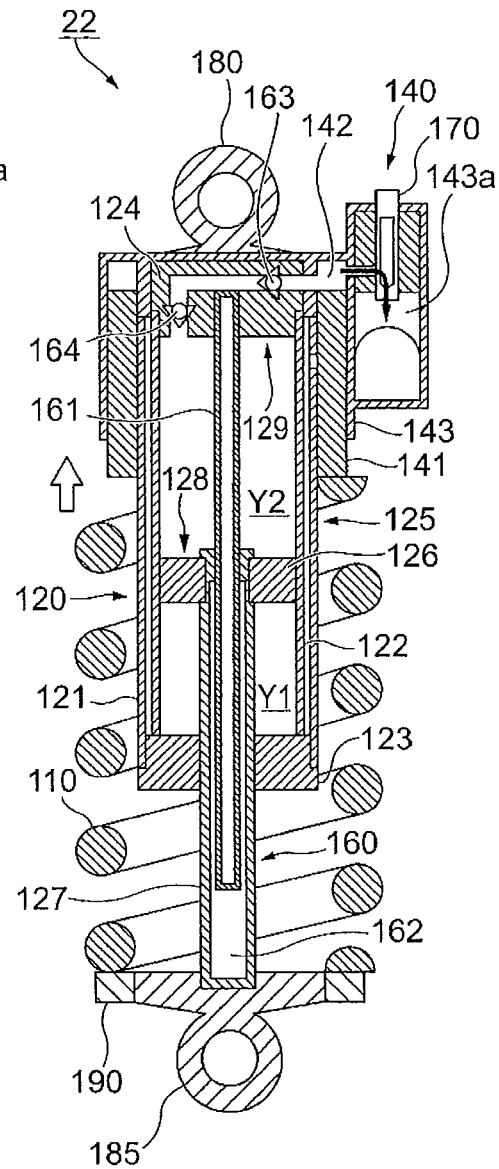

FIGS. 4A and 4B are diagrams for explaining vehicle height adjustment by the relative position changing device 140.

If the liquid is supplied into the jack chamber 142 by the liquid supply device 160 when the change-over valve 170 is closed, the liquid is filled in the jack chamber 142, the supporting member 141 moves to one end side (in FIG. 4A, the lower side) in the center line direction with respect to the hydraulic jack 143, and the spring length of the suspension spring 110 decreases (see FIG. 4A). On the other hand, when the change-over valve 170 is opened, the liquid in the jack chamber 142 is discharged to the liquid reservoir chamber 143a, the supporting member 141 moves to the other end side (in FIG. 4B, the upper side) in the center line direction with respect to the hydraulic jack 143, and the spring length of the suspension spring 110 increases (see FIG. 4B).

When the spring length of the suspension spring 110 decreases because the supporting member 141 moves with respect to the hydraulic jack 143, the spring force of the suspension spring 110 pushing the supporting member 141 increases compare with the spring force before the supporting member 141 moves with respect to the hydraulic jack 143. In such a case, when the same force acts on one end side (in FIG. 4A, the lower side) in the center line direction from the vehicle body frame 11 (seat 19) side, a sinking amount of the rear suspension 22 (a change in the distance between the vehicle body side attachment member 180 and the axle side attachment member 185) decreases. Therefore, when the sprig length of the suspension spring 110 decreases because the supporting member 141 moves with respect to the hydraulic jack 143, the height of the seat 19 increases (the vehicle height increases) compared with the height before the supporting member 141 moves with respect to the hydraulic jack 143. That is, the vehicle height increases because the change-over valve 170 is closed.

On the other hand, when the spring length of the suspension spring 110 increases because the supporting member 141 moves with respect to the hydraulic jack 143, the spring force of the suspension spring 110 pushing the supporting member 141 decreases compared with the spring force before the supporting member 141 moves with respect to the hydraulic jack 143. In such a case, when the same force acts on one end side (in FIG. 4A, the lower side) in the center line direction from the vehicle body frame 11 (seat 19) side, the sinking amount of the rear suspension 22 (the change in the distance between the vehicle body side attachment member 180 and the axle side attachment member 185) increases. Therefore, when the spring length of the suspension spring 110 increases because the supporting member 141 moves with respect to the hydraulic jack 143, the height of the seat 19 decreases (the vehicle height decreases) compared with the height before the supporting member 141 moves with respect to the hydraulic jack 143. That is, because the change-over valve 170 is opened, the vehicle height is smaller than the vehicle height at the time when the change-over valve 170 is closed.

The opening and closing of the change-over valve 170 is controlled by the control device 50.

When the change-over valve 170 is opened, the liquid supplied to the jack chamber 142 may be discharged to the first oil chamber Y1 and/or the second oil chamber Y2 in the cylinder 125.

As shown in FIG. 2, a return path 121a is formed in the outer cylinder 121 of the cylinder 125. The return path 121a is a path for returning the liquid in the jack chamber 142 to the cylinder 125 when the supporting member 141 moves to a limit position set in advance on one end side (in FIG. 2, the lower side) in the center line direction with respect to the hydraulic jack 143.

Figure 5:
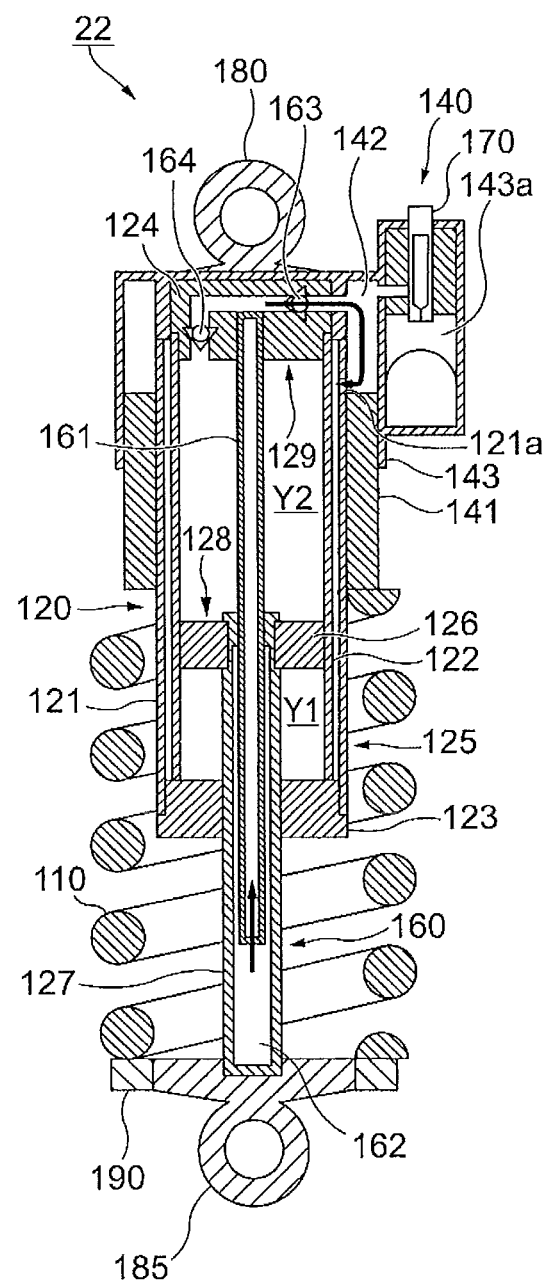
FIG. 5 is a diagram showing a mechanism in which vehicle height is maintained.

FIG. 5 is a diagram showing a mechanism in which vehicle height is maintained.

Even if the liquid continues to be supplied into the jack chamber 142 when the change-over valve 170 is closed, since the supplied liquid is returned into the cylinder 125 by the return path 121a, the position of the supporting member 141 with respect to the hydraulic jack 143 and the height of the seat 19 (the vehicle height) are maintained.

The control device 50 is explained.

Figure 6:
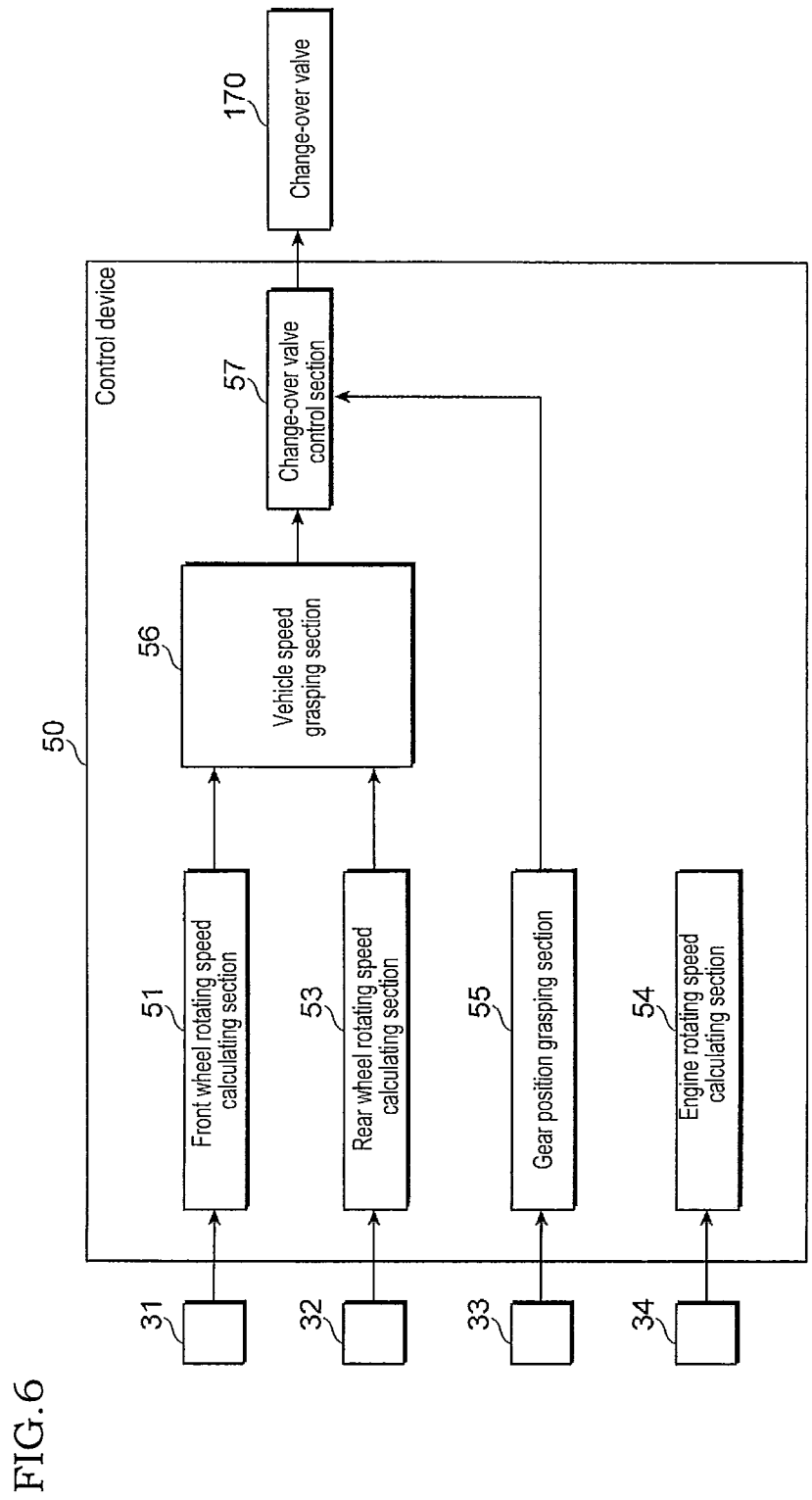
FIG. 6 is a block diagram of a control device.

FIG. 6 is a block diagram of the control device 50.

The control device 50 includes a CPU, a ROM having stored therein computer programs executed by the CPU, various data, and the like, a RAM used as a work memory and the like of the CPU, and an electrically erasable and programmable read only memory (EEPROM). Output signals from the front wheel rotation detection sensor 31, the rear wheel rotation detection sensor 32, the gear position detection sensor 33, and the like are input to the control device 50.

The control device 50 includes a front wheel rotating speed calculating section 51 configured to calculate the rotating speed of the front wheel 14 on the basis of the output signal from the front wheel rotation detection sensor 31, a rear wheel rotating speed calculating section 53 configured to calculate the rotating speed of the rear wheel 21 on the basis of the output signal from the rear wheel rotation detection sensor 32, and an engine rotating speed calculating section 54 configured to calculate the rotating speed of the engine 17 on the basis of the output signal from the engine rotation detection sensor 34. The front wheel rotating speed calculating section 51, the rear wheel rotating speed calculating section 53, and the engine rotating speed calculating section 54 respectively grasp rotating angles on the basis of pulse signals, which are output signals from the sensors, and differentiate the rotating angles with an elapsed time to calculate the rotating speeds.

The control device 50 includes a gear position grasping section 55 configured to grasp a gear position Pg of the transmission 18 on the basis of the output signal from the gear position detection sensor 33 and a vehicle speed grasping section 56 configured to grasp vehicle speed Vc, which is the moving speed of the motorcycle 1, on the basis of the rotating speed of the front wheel 14 calculated by the front wheel rotating speed calculating section 51 and/or the rotating speed of the rear wheel 21 calculated by the rear wheel rotating speed calculating section 53. The vehicle speed grasping section 56 grasps the vehicle speed Vc by calculating the moving speed of the front wheel 14 or the rear wheel 21 using front wheel rotating speed Rf or rear wheel rotating speed Rr. The moving speed of the front wheel 14 can be calculated using the front wheel rotating speed Rf and the outer diameter of a tire of the front wheel 14. The rotating speed of the rear wheel 21 can be calculated using the rear wheel rotating speed Rr and the outer diameter of a tire of the rear wheel 21. It can be understood that, when the motorcycle 1 is traveling in a normal state, the vehicle speed Vc is equal to the moving speed of the front wheel 14 and/or the moving speed of the rear wheel 21. The vehicle speed grasping section 56 may grasp the vehicle speed Vc by calculating average moving speed of the front wheel 14 and the rear wheel 21 using an average value of the front wheel rotating speed Rf and the rear wheel rotating speed Rr.

The control device 50 includes a change-over valve control section 57 configured to control opening and closing of the change-over valve 170 of the relative position changing device 140 on the basis of the vehicle speed Vc grasped by the vehicle speed grasping section 56. The change-over valve control section 57 controls the relative position changing device 140 to increase the vehicle height and improve steering performance while the motorcycle 1 is traveling in earnest (at speed equal to or higher than predetermined speed (the predetermined speed depends on the specifications of the motorcycle 1)) and reduce the vehicle height to make it easy to get on and off the motorcycle 1 when a rider is considered to get on or off the motorcycle 1. Opening and closing control processing for the change-over valve 170 performed by the change-over valve control section 57 of the control device 50 is explained below.

<First Example of the Opening and Closing Control Processing for the Change-Over Valve>

In opening and closing control processing for the change-over valve 170 according to the first example, the change-over valve control section 57 of the control device 50 closes the change-over valve 170 in order to increase the vehicle height when the gear position Pg of the transmission 18 grasped by the gear position grasping section 55 on the basis of the output from the gear position detection sensor 33 is equal to or higher than a reference gear position Pt or the vehicle speed Vc of the motorcycle 1 grasped by the vehicle speed grasping section 56 is equal to or higher than reference vehicle speed Vt set in advance. On the other hand, the change-over valve control section 57 of the control device 50 opens the change-over valve 170 in order to reduce the vehicle height when the gear position Pg of the transmission 18 grasped by the gear position grasping section 55 on the basis of the output from the gear position detection sensor 33 is lower than the reference gear position Pt or the vehicle speed Vc of the motorcycle 1 grasped by the vehicle speed grasping section 56 is lower than reference vehicle speed Vt.

The reference gear position Pt can be illustrated as second gear. The reference vehicle speed Vt can be illustrated as 8 km/h. In such a case, the change-over valve control section 57 of the control device 50 closes the change-over valve 170 in order to increase the vehicle height when the gear position Pg of the transmission 18 is second to fifth gear or the vehicle speed Vc is equal to or higher than 8 km/h. On the other hand, the change-over valve control section 57 of the control device 50 opens the change-over valve 170 in order to reduce the vehicle height when the gear position Pg of the transmission 18 is first and the vehicle speed Vc is lower than 8 km/h.

That is, the change-over valve control section 57 of the control device 50 closes the change-over valve 170 in order to increase the vehicle height irrespective of the vehicle speed Vc when the gear position Pg of the transmission 18 is equal to or higher than the reference gear position Pt. Therefore, the change-over valve control section 57 of the control device 50 can close the change-over valve 170 at desired timing even if the vehicle speed Vc cannot be accurately calculated because of a failure (e.g., breaking of wire) of the front wheel rotation detection sensor 31 and/or the rear wheel rotation detection sensor 32 or because of a failure (a failure of an input circuit, a failure of a computer program, etc.) of means (e.g., the front wheel rotating speed calculating section 51 and/or the rear wheel rotating speed calculating section 53) for calculating the vehicle speed Vc on the basis of the output signals from the front wheel rotation detection sensor 31 and/or the rear wheel rotation detection sensor 32. For example, when a failure in which the output signals from the front wheel rotation detection sensor 31 and/or the rear wheel rotation detection sensor 32 cannot be acquired occurs, since the vehicle speed grasping section 56 calculates the vehicle speed Vc as zero, the change-over valve control section 57 of the control device 50 can open the change-over valve 170 at desired timing. In this way, the control device 50 can change the level of the vehicle height even if vehicle speed cannot be accurately grasped (calculated).

A procedure of the opening and closing control processing for the change-over valve 170 performed by the change-over valve control section 57 of the control device 50 is explained with reference to a flowchart.

Figure 7:
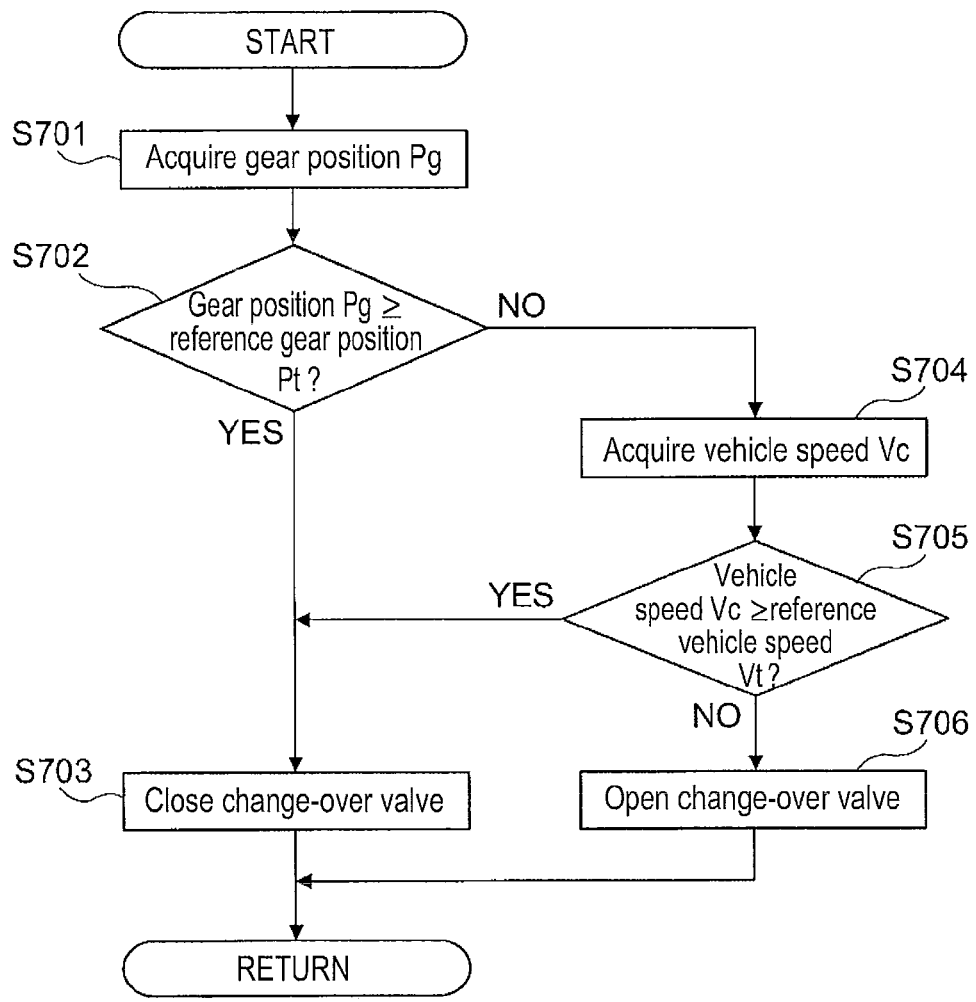
FIG. 7 is a flowchart for explaining a procedure of opening and closing control processing of a change-over valve performed by a change-over valve control section of the control device.

FIG. 7 is a flowchart for explaining the procedure of the opening and closing control processing for the change-over valve 170 performed by the change-over valve control section 57 of the control device 50. The change-over valve control section 57 repeatedly executes the opening and closing control processing in every period set in advance.

First, the change-over valve control section 57 reads the gear position Pg of the transmission 18 stored in the RAM to thereby acquire the gear position Pg (step (hereinafter simply referred to as "S") 701). Thereafter, the change-over valve control section 57 discriminates whether the gear position Pg acquired in S701 is equal to or higher than the reference gear position Pt (S702). When the gear position Pg is equal to or higher than the reference gear position Pt (YES in S702), the change-over valve control section 57 closes the change-over valve 170 (S703). Consequently, the vehicle height of the motorcycle 1 increases.

On the other hand, when the gear position Pg is not equal to or higher than the reference gear position Pt (NO in S702), the change-over valve control section 57 reads the vehicle speed Vc of the motorcycle 1 stored in the RAM to thereby acquire the vehicle speed Vc (S704). Thereafter, the change-over valve control section 57 discriminates whether the vehicle speed Vc acquired in S704 is equal to or higher than the reference vehicle speed Vt (S705). When the vehicle speed Vc is equal to or higher than the reference vehicle speed Vt (YES in S705), the change-over valve control section 57 closes the change-over valve 170 (S703). On the other hand, when the vehicle speed Vc is not equal to or higher than the reference vehicle speed Vt (NO in S705), i.e., when it is determined in S702 that the gear position Pg is lower than the reference gear position Pt and it is determined that the vehicle speed Vc is lower than the reference vehicle speed Vt, the change-over valve control section 57 opens the change-over valve 170 (S706).

In this way, the change-over valve control section 57 of the control device 50 performs the opening and closing control processing. Consequently, the control device 50 can more accurately close the change-over valve 170 in order to increase the vehicle height irrespective of the vehicle speed Vc when the gear position Pg of the transmission 18 is equal to or higher than the reference gear position Pt.

The front wheel rotating speed calculating section 51, the rear wheel rotating speed calculating section 53, and the vehicle speed grasping section 56 respectively calculate the front wheel rotating speed Rf, the rear wheel rotating speed Rr, and the vehicle speed Vc at a period equal to or smaller than a period in which the change-over valve control section 57 executes the opening and closing control processing and stores the front wheel rotating speed Rf, the rear wheel rotating speed Rr, and the vehicle speed Vc in the RAM. The gear position grasping section 55 grasps the gear position Pg at the period equal to or smaller than the period in which the change-over valve control section 57 executes the opening and closing control processing and stores the gear position Pg in the RAM.

In the first example of the opening and closing control processing for the change-over valve 170, the change-over valve control section 57 controls the opening and closing of the change-over valve 170 taking into account the calculated vehicle speed Vc of the motorcycle 1. However, the change-over valve control section 57 may control the opening and closing of the change-over valve 170 without taking into account the vehicle speed Vc.

That is, the control device 50 may close the change-over valve 170 in order to increase the vehicle height irrespective of the vehicle speed Vc when the gear position Pg of the transmission 18 grasped by the gear position grasping section 55 on the basis of the output from the gear position detection sensor 33 is equal to or higher than the reference gear position Pt. The control device 50 may open the change-over valve 170 in order to reduce the vehicle height irrespective of the vehicle speed Vc when the gear position Pg is lower than the reference gear position Pt.

Even in such a form, the control device 50 can open and close the change-over valve 170 at desired timing even if the vehicle speed Vc cannot be accurately calculated (grasped) because of a failure of the front wheel rotation detection sensor 31 and/or the rear wheel rotation detection sensor 32 or because of a failure of means for calculating the vehicle speed Vc on the basis of the output signals from the front wheel rotation detection sensor 31 and/or the rear wheel rotation detection sensor 32.

The control device 50 may control the opening and closing of the change-over valve 170 without taking into account the vehicle speed Vc in this way after the accurate vehicle speed Vc cannot be calculated because of a failure of the front seat rotation detection sensor 31 and/or the rear wheel rotation detection sensor 32 or because of a failure of the means for calculating the vehicle speed Vc on the basis of the outputs of the front wheel rotation detection sensor 31 and/or the rear wheel rotation detection sensor 32. As explained below, the control device 50 can grasp that the accurate vehicle speed Vc cannot be calculated. For example, the control device 50 can grasp that the accurate vehicle speed Vc cannot be calculated when the vehicle speed Vc grasped by the vehicle speed grasping section 56 suddenly changes to zero from a state in which the vehicle speed Vc is speed (e.g., 30 km/h) at which the motorcycle 1 is traveling or when a situation in which the vehicle speed Vc grasped by the vehicle speed grasping section 56 is zero although the rotating speed of the engine 17 calculated by the engine rotating speed calculating section 54 on the basis of the output from the engine rotation detection sensor 34 is not zero continues exceeding a number of times set in advance.

<Second Example of the Opening and Closing Control Processing for the Change-Over Valve>

A second example of the opening and closing control processing for the change-over valve 170 is different from the first example of the opening and closing control processing for the change-over valve 170 in that the change-over valve control section 57 of the control device 50 is based on estimated vehicle speed Va defined in advance according to the gear position Pg.

That is, the change-over valve control section 57 of the control device 50 closes the change-over valve 170 in order to increase the vehicle height when the estimated vehicle speed Va defined in advance according to the gear position Pg is equal to or higher than rising reference vehicle speed Vtu for increasing the vehicle height set in advance or the vehicle speed Vc of the motorcycle 1 calculated by the vehicle speed grasping section 56 is equal to or higher than the rising reference vehicle speed Vtu. On the other hand, the change-over valve control section 57 of the control device 50 opens the change-over valve 170 in order to reduce the vehicle height when the estimated vehicle speed Va defined in advance according to the gear position Pg is lower than falling reference vehicle speed Vtd for reducing the vehicle height and the vehicle speed Vc of the motorcycle 1 calculated by the vehicle speed grasping section 56 is lower than the falling reference vehicle speed Vtd.

The rising reference vehicle speed Vtu can be illustrated as 8 km/h and the falling reference vehicle speed Vtd can be illustrated as 5 km/h. The estimated vehicle speed Va defined in advance according to the gear position Pg can be illustrated as explained below. For example, the estimated vehicle speed Va can be illustrated as 0 km/h when the gear position Pg is first gear, can be illustrated as 20 km/h when the gear position Pg is second gear, can be illustrated as 40 km/h when the gear position Pg is third gear, can be illustrated as 60 km/h when the gear position Pg is fourth gear, and can be illustrated as 80 km/h when the gear position Pg is fifth gear.

In such a case, the change-over valve control section 57 of the control device 50 closes the change-over valve 170 in order to increase the vehicle height when the gear position Pg of the transmission 18 is second to fifth gear or the vehicle speed Vc is equal to or higher than 8 km/h. The change-over valve control section 57 of the control device 50 opens the change-over valve 170 in order to reduce the vehicle height when the gear position Pg of the transmission 18 is first gear and the vehicle speed Vc is lower than 8 km/h.

Even in the opening and closing control processing for the change-over valve 170 according to the second example, the change-over valve control section 57 of the control device 50 can open and close the change-over valve 170 at desired timing even if the vehicle speed Vc cannot be accurately calculated because of a failure of the front wheel rotation detection sensor 31 and/or the rear wheel rotation detection sensor 32 or because of a failure of the means for calculating the vehicle speed Vc on the basis of the output signals from the front wheel rotation detection sensor 31 and/or the rear wheel rotation detection sensor 32.

In the second example of the opening and closing control processing for the change-over valve 170, as in the first example, the vehicle speed grasping section 56 controls the opening and closing of the change-over valve 170 taking into account the vehicle speed Vc of the motorcycle 1 calculated by the vehicle speed grasping section 56. However, the change-over valve control section 57 may control the opening and closing of the change-over valve 170 without taking into account the vehicle speed Vc.

That is, the control device 50 may close the change-over valve 170 in order to increase the vehicle height irrespective of the vehicle speed Vc when the estimated vehicle speed Va defined in advance according to the gear position Pg of the transmission 18 grasped on the basis of the output from the gear position detection sensor 33 is equal to or higher than the rising reference vehicle speed Vtu. The control device 50 may open the change-over valve 170 in order to reduce the vehicle height irrespective of the vehicle speed Vc when the estimated vehicle speed Va defined in advance according to the gear position Pg is lower than the falling reference vehicle speed Vtd.

The control device 50 may control the opening and closing of the change-over valve 170 without taking into account the vehicle speed Vc in this way after the accurate vehicle speed Vc cannot be calculated because of a failure of the front seat rotation detection sensor 31 and/or the rear wheel rotation detection sensor 32 or because of a failure of the means for calculating the vehicle speed Vc on the basis of the outputs of the front wheel rotation detection sensor 31 and/or the rear wheel rotation detection sensor 32. As explained above, the control device 50 can grasp that the accurate vehicle speed Vc cannot be calculated.

EXPLANATION OF REFERENCE NUMERALS

1 motor cycle, 11 vehicle body frame, 18 transmission, 21 rear wheel, 22 rear suspension, 33 gear position detection sensor, 50 control device, 51 front wheel rotating speed calculating section, 53 rear wheel rotating speed calculating section, 54 engine rotating speed calculating section, 55 gear position grasping section, 56 vehicle speed grasping section, 57 change-over valve control section, 110 suspension spring, 120 shock absorber, 140 relative position changing device, 160 liquid supply device, 170 change-over valve, 180 vehicle body side attachment member, 185 axle side attachment member, 190 spring bearing

What is claimed is:

1. A vehicle height adjusting device comprising:
a changing unit capable of changing relative positions of a vehicle main body and a wheel of a vehicle including a transmission configured by a plurality of gears, the positions of the plurality of gears of the transmission being selected according to operation by a driver; and
a control unit for controlling the changing unit and changing the relative positions of the wheel and the vehicle main body to adjust vehicle height, which is height of the vehicle main body, wherein
the control unit controls the changing unit to increase the vehicle height when a gear position of the transmission is equal to or higher than a predetermined gear position set in advance and reduce the vehicle height when the gear position is lower than the predetermined gear position.

2. The vehicle height adjusting device according to claim 1, wherein the control unit controls the changing unit to increase the vehicle height when the gear position of the transmission including gears for two or more gear positions is at second or higher gear position and reduce the vehicle height when the gear position is at first gear position.

3. A vehicle height adjusting device comprising:
a changing unit capable of changing relative positions of a vehicle main body and a wheel of a vehicle including a transmission configured by a plurality of gears, the positions of the plurality of gears of the transmission being selected according to operation by a driver; and
a control unit for controlling the changing unit and changing the relative positions of the wheel and the vehicle main body to adjust vehicle height, which is height of the vehicle main body, wherein
the control unit stores, for each of gear positions of the transmission, vehicle speed defined in advance according to the gear position and controls the changing unit to increase the vehicle height when a gear position of the transmission is a gear position where the defined vehicle speed is equal to or higher than first vehicle speed set in advance and reduce the vehicle height when the gear position is a gear position where the defined vehicle speed is lower than second vehicle speed set in advance.

4. A vehicle height adjusting device comprising:
a changing unit capable of changing relative positions of a vehicle main body and a wheel of a vehicle including a transmission configured by a plurality of gears; and
a control unit for controlling the changing unit and changing the relative positions of the wheel and the vehicle main body to adjust vehicle height, which is height of the vehicle main body, wherein
the control unit stores, for each of gear positions of the transmission, vehicle speed defined in advance according to the gear position an controls the changing unit to increase the vehicle height when a gear position of the transmission is a gear position where the defined vehicle speed is equal to or higher than first vehicle speed set in advance and reduce the vehicle height when the gear position is a gear position where the defined vehicle speed is lower than second vehicle speed set in advance; wherein,
when vehicle speed defined in advance according to one gear position among a plurality of gear positions of the transmission is lower than the first vehicle speed and the second vehicle speed and vehicle speed defined in advance according to another gear position, which is higher by one than the one gear position, is equal to or higher than the first vehicle speed and the second vehicle speed, the control unit controls the changing unit to increase the vehicle height when the gear position of the transmission is equal to or higher than the other gear position and reduce the vehicle height when the gear position is equal to or lower than the one gear position.

* * * * *